United States Patent [19]

Isak

[11] 3,728,607

[45] Apr. 17, 1973

[54] PHASE ANALOG NUMERICAL CONTROL SYSTEM EMPLOYING A LASER DIGITIZED POSITION FEEDBACK

[75] Inventor: Conrad J. Isak, Waynesboro, Va.

[73] Assignee: General Electric Company, Lynn, Mass.

[22] Filed: Feb. 29, 1968

[21] Appl. No.: 709,405

[52] U.S. Cl. .................. 318/608, 318/640, 318/603, 235/151.11, 90/13
[51] Int. Cl. ............................................. G05b 1/01
[58] Field of Search .................... 235/151.11; 90/13; 318/603, 608, 640, 572

[56] References Cited

UNITED STATES PATENTS

| | | | |
|---|---|---|---|
| 3,120,603 | 2/1964 | Jones | 318/20.120 X |
| 3,320,501 | 5/1967 | Davies | 318/20.370 X |

OTHER PUBLICATIONS

"Laser Interferometer," F. H. London, Instruments and Control Systems, Vol. 37, No. 11, 11/1964, pps. 87–89.

*Primary Examiner*—T. E. Lynch
*Attorney*—William S. Wolfe, Frank L. Neuhauser, Oscar B. Waddell and Joseph B. Forman

[57] ABSTRACT

A digitally operable phase analog numerical control is described which comprises position measuring means for producing a train of pulses wherein the individual pulses represent increments of movement of apparatus being controlled and hence is representative of the position of the apparatus in standard measurement units. Variable rate feedback counter means are coupled to the output from the conversion circuit for producing a variably phase shifted, phase analog actual position output signal in accordance with the digitized position signal. Phase discriminator means are also provided having one input coupled to the output from the feedback phase counter and a digitally operable command phase counter means is provided for producing an output phase analog command signal of substantially the same base frequency and waveshape as the feedback phase counter. The output of the command phase counter is supplied to a second input of the phase discriminator and serves as a command phase analog signal against which the actual position phase analog signal represented by the output of the feedback phase counter, is compared. The output from the phase discriminator represents the difference between the actual and desired positions of the apparatus being controlled, and is utilized to control the position of such apparatus. In practice, the position measuring means preferably comprises an interferometer position gauging device and the predetermined conversion factor is a function of the space measured in microinches or micrometers between fringes of the fringe count produced by the interferometer.

4 Claims, 2 Drawing Figures

INVENTOR.
CONRAD J. ISAK
BY Michael Masnik
HIS ATTORNEY

PHASE ANALOG NUMERICAL CONTROL SYSTEM EMPLOYING A LASER DIGITIZED POSITION FEEDBACK

BACKGROUND OF THE INVENTION

1. Field of Invention

This invention relates to an improved numerical control system of the phase analog type which utilizes a digital feedback arrangement to provide highly accurate positioning control.

More particularly, the invention relates to a phase analog numerical control system employing an interferometer position gauging device for deriving fringe count, signals representative of the position of a machine tool being controlled and including means for converting the signal from the interferometer position gauging device into a corresponding phase analog position feedback signal for use by the phase analog numerical control system in controlling the operations of the machine tool.

2. Description of Prior Art

A numerical control system is an electronic control for controlling the motion of the cutting element of a machine tool relative to the workpiece. In the more sophisticated numerical control systems, the control causes the cutting element of the machine tool to be moved relative to the workpiece in a manner so that it describes a contoured or complicated cutting path on the workpiece. The predetermined speed, path length and direction for each leg or cut which the machine tool is constrained to follow under the direction or command of the numerical contouring control system, is typically fed into the control system in numerical form by being programmed on punched tape or punched cards, although in certain applications magnetic tape also is used. This numerical data input is routed to appropriate subsystems of the control whereby the control function is performed.

In order that the numerical data input information can be utilized by the numerical electronic control, the data input must be presented or converted into an electrical form compatible with the overall system, and which enables the system to accurately control the speed and path of the machine tool relative to the workpiece. A preferred form of representing data input commands with electrical signals that is used in the art, is by converting the commands to a train of electrical pulses. In such a representation, each pulse in the electrical pulse train corresponds to a discrete increment of motion of the cutting tool relative to the workpiece. For example, if the control system generates N pulses, the machine tool, in obeying the command of the control system, moves a distance of N times the incremental distance represented by each pulse. In an embodiment of the control to be described hereinafter, the incremental distance represented by each command pulse is 0.0001 of an inch. If the control system were to generate 100,000 pulses, for the purpose of determining a path length, then the total motion that would be traversed by the cutting tool relative to the workpiece would be 100,000 × 0.0001 or 10 inches.

In addition to the above convention, the pulses occurring in the electrical pulse train which represent an incremental distance, are produced at some predetermined frequency or pulse repetition rate. This pulse repetition rate is employed to define velocity and is used to control the speed of motion of the machine tool. This is convenient since pulse rate is convertible into increments of distance per unit of time. Accordingly, in most conventional machine tool numerical controls, the length of each cut is commensurate with the total number of pulses, and the speed of motion of the cutting tool relative to the workpiece is commensurate with the pulse frequency or pulse repetition rate.

The general organization of the phase analog numerical control system comprising the invention, contemplates that the incremental path length and velocity commands of the control system are represented by the phase and rate of change of phase, respectively of an essentially square waveform phase analog signal supplied to a servomechanism which in turn is coupled to and drives the machine tool. A suitable position measuring instrument observes the position of the machine tool as the machine tool responds to the command signals, and generates an actual position square waveform phase analog position signal whose phase relative to a command signal is representative of the instantaneous position error of the machine tool. The phase of the command phase analog signal is compared with the phase of the actual position phase analog signal so that an error signal directly proportional to the phase difference may be generated to provide feedback control in the feedback loop of a servomechanism controlling the operation of the cutting tool. The magnitude of the error signal, and its sense or polarity (determined by whether the phase of the command signal leads or lags the phase of the actual position signal) causes the machine tool to move in such a direction, and at such a rate, as to tend to reduce the magnitude of the error signal to zero.

During operation of a phase analog numerical control system having the above characteristics, the same basic square waveshape and phase relative to a reference timing or synchronizing signal it provided for the command phase analog signal as is provided for the actual position feedback phase analog signal. Hence, with a commanded velocity of zero, and an actual tool velocity of zero, two equal frequency and in-phase square waveshape phase analog signals are applied to the comparison means. This results in a zero difference or zero error signal, and the machine tool stays in its set position. However, upon the commanded velocity being other than zero, means are provided for continuously changing the phase of the command phase analog signal relative to the reference timing or synchronizing signal. Comparison of this phase modulated command phase analog signal with the phase of the actual position feedback phase analog signal (which incidentally is still at rest) will indicate a phase difference increasing in magnitude which causes the servomechanism controlling the machine tool cutting head to move the machine tool in the direction and at a rate determined by the polarity and magnitude of this phase difference.

Phase analog controlled servomechanisms including the phase comparison portion of the system are well known, and operate reliably and satisfactorily in controlling the movement of machine tool cutting heads. For these reasons, in addition to the reasons of economy and compatibility, it is desired to retain these portions of a phase analog numerical control system. However, due to the ever increasing demand for higher accuracy and greater precision in the operation of numerically controlled machine tools, it has proven necessary to provide much more precise and accurate position feedback information than has been heretofore obtainable with the resolver type of phase analog feedback elements presently being used in the art. For this reason, it has proven necessary to provide in a numerically controlled machine, a very precise, digitally operable position measuring device capable of smaller measurements such as thousandths, 10 thousandths and even millionths of an inch. Comparable measurements in the metric system are also obtainable.

A suitable, precision, digitally operable position measuring device for use in the above mentioned fashion is the interferometer position gauging device which employs a laser interferometer to produce an output, variable rate, direction indicating, digitized fringe counter measurement signal wherein the spacing between the fringe count pulses is representative of dimensions on the order of $3.1142697 \times 10^{-6}$ inches (or a comparable figure for operation in the metric system). To render the interferometer position gauging device compatible for use with existing numerically controlled machine tools, it was necessary to provide some means for converting the position indicating fringe count signal pulses produced by the interferometer into meaningful units of distance measurement such as inches or centimeters. In copending U.S. Pat. application Ser. No. 709,387 for Leroy U. C. Kelling, inventor, entitled "Conversion Apparatus for Converting Nonstandard Pulse Count to Standard Measurement Count" and filed Feb. 29, 1968, a conversion apparatus is described for receiving the variable rate, direction indicating fringe count signal pulses derived from an interferometer position gauging device employed as the position feedback element of a numerically controlled machine tool or some similar apparatus, and for converting the input fringe count signal pulses into an output signal representative of a quantity (position) to be measured in terms of recognized measurement units such as inches or centimeters. It should be noted, however, that the output signal derived from the conversion apparatus described in the above identified copending application, is digitized in nature. In order to render the laser interferometer or similar position gauging device and any associated conversion circuitry suitable for use with phase analog type of numerical control systems, the present invention was devised.

SUMMARY OF THE INVENTION

It is therefore a primary object of the invention to provide an improved numerical control system of the phase analog type which employs a digitized feedback measurement to provide highly accurate and precise positioning control.

Another object of the invention is to provide a phase analog numerical control system employing an interferometer or similar position gauging device for deriving fringe count, direction indicating, signals representative of the position of a machine tool being controlled and including means for converting the signal from the interferometer or similar position gauging device into corresponding phase analog position feedback signals for use by the phase analog numerical control system in controlling the operation of the machine tool.

In practicing the invention a phase analog numerical control is provided which comprises phase discriminator means having two inputs with one input being coupled to the output from a command signal generating means for producing a command signal having a base frequency and waveshape and serving as a command phase analog signal against which a phase analog actual position feedback signal is compared by the phase discriminator means. The output from the phase discriminator means represents the difference between the actual and desired or commanded positions of a machine tool or other apparatus being controlled, and is utilized to control the position of such apparatus. The improvement made possible by the present invention comprises position measuring means preferably in the form of an interferometer as described in the aforementioned patent application or similar position gauging device, for example, as described in U.S. Pat. No. 3,114,046 issued Dec. 10, 1963, for producing position signals indicative of the position of the apparatus being controlled measured along at least one axis of movement of the apparatus. The improvement further includes phase analog position feedback signal deriving means formed by a feedback variable phase counter which is operatively coupled to the output of the position measuring means for producing a corresponding, variably phase shifted, phase analog position output signal in response to the position signal supplied thereto. The variably phase shifted, phase analog position output signal is of substantially the same base frequency and waveshape as the command signal, and is supplied to the phase discriminator means as a phase analog actual position signal for comparison to the command phase analog signal.

In a preferred embodiment of the invention, conversion circuit means are interposed between the position measuring means and the phase analog position feedback signal deriving means for converting the digitized output signal by multiplying the same by a predetermined conversion factor to produce a corresponding conversion output digitized signal representative of the position in standard measurement units. The output of the conversion circuit means is then supplied to the input of the feedback phase counter to provide a phase analog feedback signal. Also in a preferred form of the invention, means are included for changing the value of the conversion factor by which the input measurement pulses are multiplied in the conversion circuit means.

Another object of this invention is to provide an improved signal processing arrangement.

BRIEF DESCRIPTION OF THE DRAWINGS

Other objects, features and many of the attendant advantages of this invention will be appreciated more readily as the same becomes better understood by reference to the following detailed description, when considered in connection with the accompanying drawings, wherein like parts in each of the several FIGS. are identified by the same reference character, and wherein.

DETAILED DESCRIPTION OF THE PREFERRED EMBODIMENT

Figure 1:
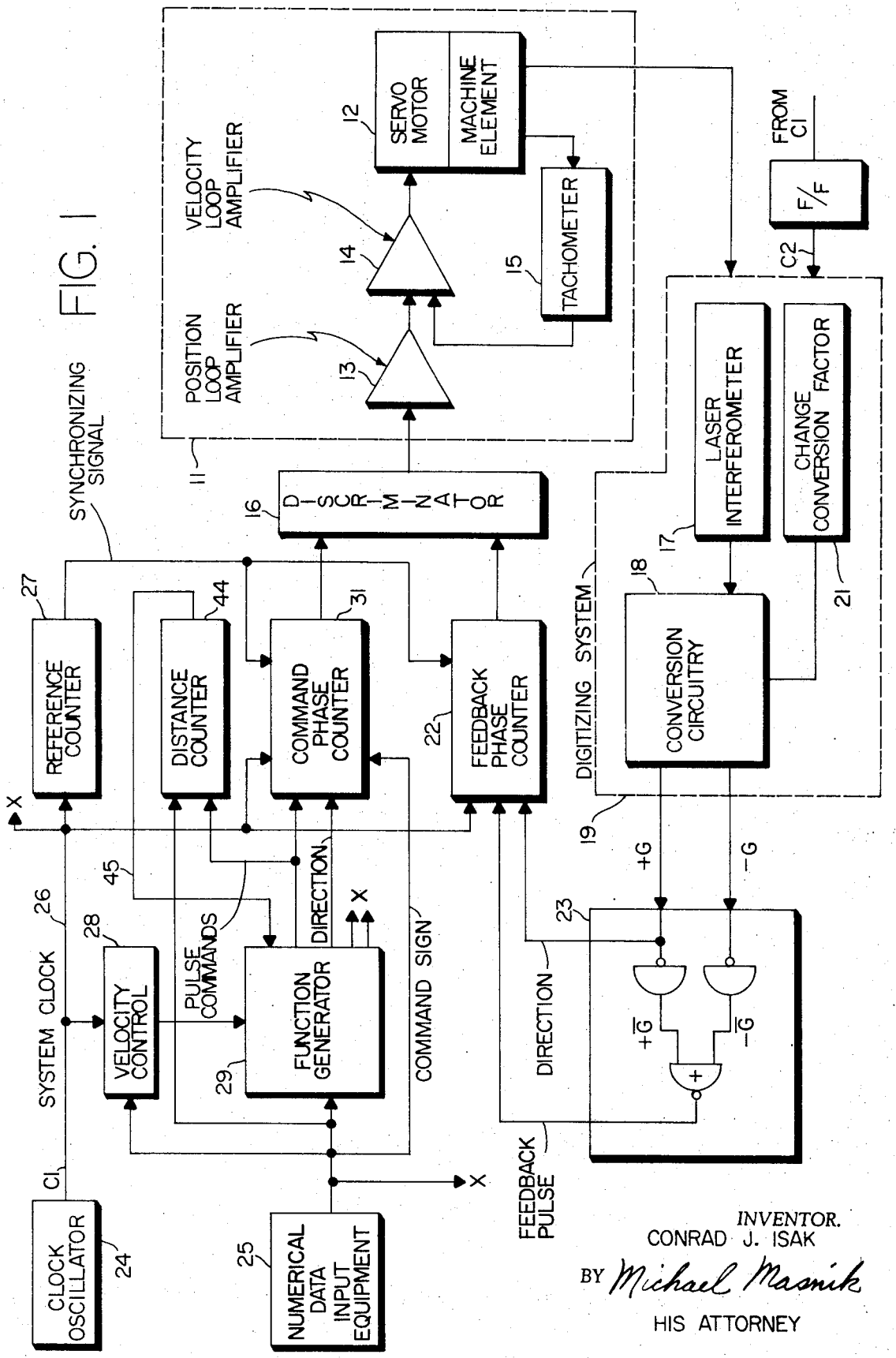
FIG. 1 of the drawings is a functional block diagram of a phase analog numerical control constructed in accordance with the present invention.

The numerical contouring control system shown in FIG. 1 of the drawings comprises a part of an overall control system for automatically controlling a machine tool by a Y axis servomechanism and a X axis servomechanism with the Y axis servomechanism only being shown generally in the dotted outline box 11. It is to be understood that the servomechanisms for both the Y axis and the X axis will actually include appropriate drive shafts, gearing and the like which actuate the machine element for motion along the two coordinates. If desired, additional controls, such as a third orthogonal coordinate (Z) control could be included, but in order to simplify the explanation of the invention, only the Y axis servomechanism and its associated control element will be considered. The machine element being controlled, forming a part of machine 12, may be the cutting tool itself, or it may be the table holding the workpiece which is to be contoured, or it may be both. For the purpose of this description, it is assumed that the machine element represents the cutting tool being controlled. Since the equipment throughout the system for the various controlled axes or channels can be the same, for simplification, only the Y coordinate control will be described.

The Y coordinate servomechanism, indicated by the dotted outline box 11, is comprised by a position loop amplifier 13 and a velocity loop amplifier 14 which supplies an excitation signal to the servomotor portion of 12 to control Y axis movement of the machine 12. A tachometer indicated at 15 normally provides a feedback stabilizing signal from the machine to the velocity loop amplifier 14 stabilizing operation of the servomechanism.

In a conventional, phase analog numerical control system, a position resolver is generally coupled to the servomotor for generating a Y axis actual position phase analog feedback signal that subsequently is shaped and supplied back to the electronic control circuitry for comparison to a phase analog command signal supplied to a phase discriminator shown at 16 whose output drives the position loop amplifier 13 and velocity loop amplifier 14. In the phase discriminator 16, the phase of the phase analog command signal is compared with the phase of the actual position phase analog supplied from the position resolver. The difference in the phase between the command and the actual position feedback signal is commensurate with the difference between the commanded position and the actual position of the machine at any given instant of time. This phase difference signal is then supplied as an instantaneous error signal through the position loop amplifier 13 and velocity loop amplifier 14 to cause the servomotor portion of 12 to drive the Y axis feed mechanism in a direction to cause the value of the instantaneous error signal to be reduced to zero. A phase analog numerical control system employing such a position resolver to derive the actual position phase analog feedback signal is described more fully in issued U.S. Pat. No. 3,120,603 issued Feb. 4, 1964 for "An Automatic Control Apparatus" J. E. Jones, inventor, assigned to the General Electric Company.

While a position resolver is adequate in many applications for a numerical control machine to develop the actual position feedback phase analog signal, there are many instances where such position revolvers just do not provide sufficient precision or accuracy to be employed. To meet such situations, the present invention was devised and contemplates utilizing a digitizing measurement system 19 comprised by a laser interferometer position gauging device 17 for deriving fringe count signals. As stated earlier, because the laser interferometer derives variable rate, direction indicating fringe count signals which generally speaking are indicative of only some fractional part of standard measurement units, conversion circuit means comprising 18 and 21 are required to be used in conjunction with the output fringe count signal developed by the laser interferometer 17 in order to convert the fringe count derived therefrom into a digitized position signals scaled to standard measurement units. The above-identified copending Kelling U. S. application Ser. No. 709,387 discloses a suitable digitizing measurement system 19 comprised by elements such as 18 and 21 for use in converting the output measurement fringe count signals from laser interferometer 17 into digitized position signals scaled to standard measurement units. Also, because changes in environmental operating conditions of the laser interferometer 17 will affect the output measurement signals derived from this device, 21 also permits changing the value of the conversion factor employed by the conversion circuit means 18 in converting the fringe count signal pulses to a count of known measurement units. Such a conversion factor changing means is described in greater detail in the above-identified copending U. S. application Ser. No. 709,387. It will be appreciated from the foregoing discussion, that the digitizing system shown in the dotted outline box 19 therefore comprises a digitally operable position measuring means for producing digitized position signals in which each pulse is indicative of a discrete amount or increment of movement of an apparatus (machine) being controlled as measured along at least one axis of movement of the apparatus. Similar digitally operable position measuring means would be required for each additional axis of movement. That is, the output of 19 is a pulse train whose individual pulses represent increments of movement of said object which increments of movement have been scaled in 21 after being converted into pulse form in 18 to correspond to the scale of pulse increments applied to 31 from 29.

Figure 2:
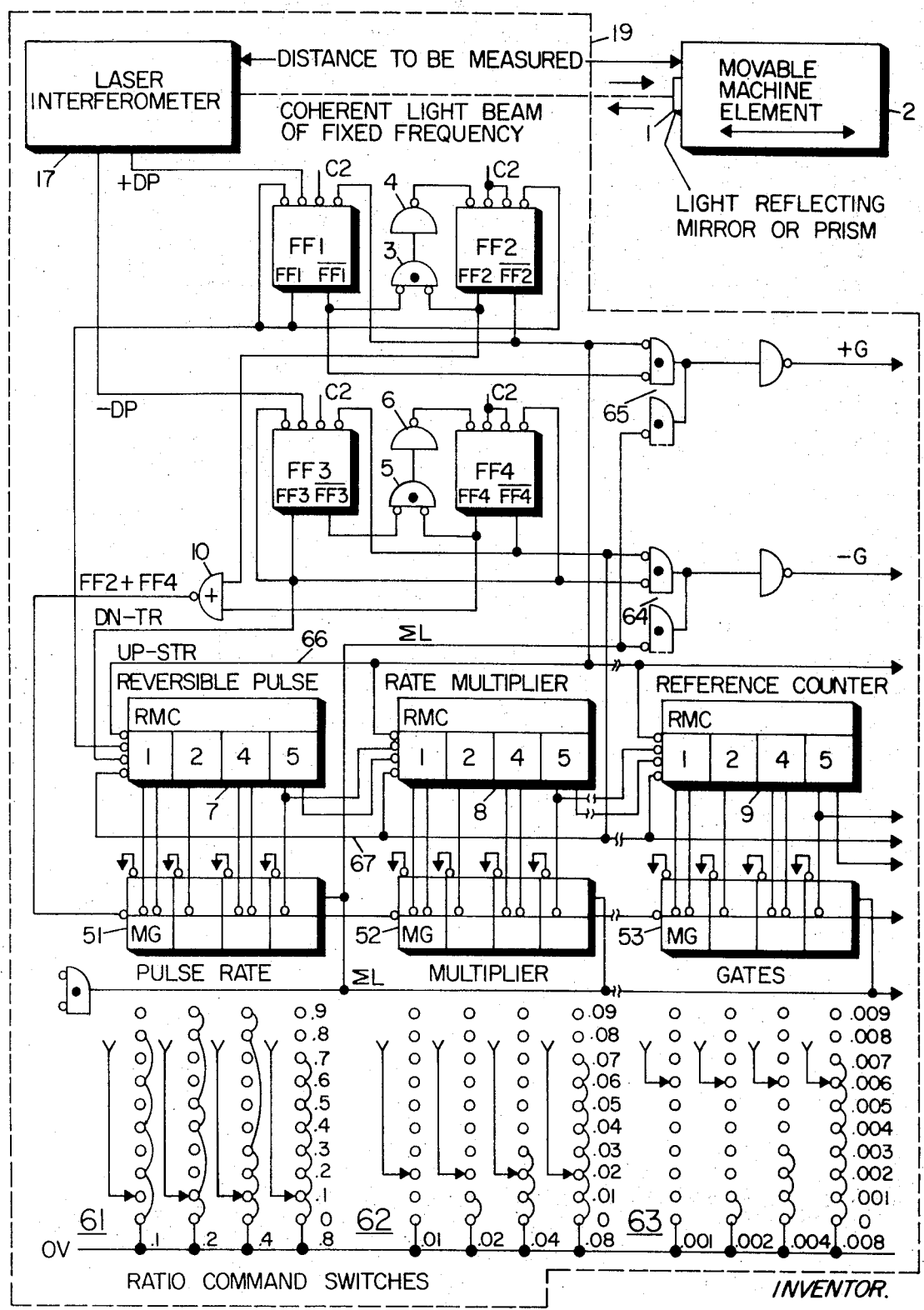
FIG. 2 illustrates the details of the digitizing system block shown in FIG. 1.

FIG. 2 of the drawings is a detailed logical circuit diagram of one suitable form of a conversion and measuring apparatus or digitizing system 19 which employs a reversible pulse rate multiplier as the numerical processing means thereof. In FIG. 2, the measuring assembly 11 is illustrated as comprising a conventional, commercially available laser interferometer position gauging device 17 which projects a coherent light beam onto a light reflecting element 1 such as a mirror or prism fixed to a movable machine element 2 that may comprise the working head or machine element of a numerically controlled machine tool. The coherent light beam impinging on the light reflecting surface 1 is then reflected back to a detector comprising a part of the laser interferometer 17 where it interacts with a directly supplied reference coherent light beam to produce interference fringe counts that are indicative of changes in position of the movable machine element 2. The laser interferometer 17 then operates to detect the interference fringe counts produced by the projected and reflected light beam as the distance to the reflected surface 1 changes, and produces output pulses for each fringe change cycle. The laser interferometer 17 produces an output of plus direction pulses (+DP) and minus direction pulses (−DP) for each fringe change in the up-scale and down-scale direction, respectively.

The directional pulses +DP and −DP are supplied to direction logic circuit means comprised by synchronizing flip-flops FF1, FF2, FF3 and FF4. The flip-flops FF1 and FF2 are interconnected through a two input AND gate 3 and a power driver inverter 4 with the $\overline{FF1}$ terminal of flip-flop FF1, and the FF2 terminal of flip-flop FF2 being connected to the two input terminals of AND gate 3. AND gate 3 has its output terminal connected through the power driver inverter 4 to the set steering terminal of flip-flop FF2. The FF1 (set) output terminal of flip-flop FF1 is connected directly back to its set steering input terminal and is connected to the reset steering input terminal of flip-flop FF2. The $\overline{FF2}$ (reset) output terminal of flip-flop FF2 is connected back to the reset steering input terminal of flip-flop FF1 and also serves to develop the gate signal $\overline{FF2}$ for steering the up-count gates of the reversible pulse rate multiplier reference counter to be described hereinafter. Input clock pulses C2 are applied to both trigger input terminals of flip-flop FF2, and to the reset trigger input terminal of flip-flop FF1. The set trigger input terminal of flip-flop FF1 is connected to the source of +DP input fringe count pulses supplied from laser interferometer 17. The flip-flops FF3 and FF4 are similarly interconnected through an AND gate 5 and power driver inverter 6 with the exception that the set trigger input terminal of flip-flop FF3 is connected to the −DP fringe count pulses supplied from laser interferometer 17. The interconnection of flip-flops FF1 through FF4 in this manner forms a pulse synchronizing circuit which causes the reversible pulse rate multiplier counter to count up or down by one count for each +DP or −DP fringe count pulse supplied from the laser interferometer as will be described more fully hereinafter.

For a more detailed description of the construction and operation of the flip-flops FF1 through FF4, the AND gates 3 and 5 which are inverting AND gates, and the power driver inverters 4 and 6, reference is made to any of the standard texts on the design of logical circuits. For example, see the textbook entitled "Logical Design of Digital Computers" by Montgomery Phister, author, John Wiley Publishing Company or the text entitled "Design of Transistorized Circuits for Digital Computers" by Abraham I. Pressman, John F. Rider Publishing Company, Inc. of New York, 1959. A more detailed description of these logic circuit elements also may be found in U. S. Pat. No. 3,120,603 issued Feb. 4, 1964 for "An Automatic Control Apparatus," J. E. Jones, inventor, assigned to the General Electric Company. In connection with these logical circuit elements, it may be well to note that in the logical circuit shown in FIG. 2, the logic value or state "0" as used hereinafter implies that a positive voltage is present on the indicated lead. Conversely, the logic value "1" implies that a zero or reference voltage is present on the indicated lead. This notation is consistent with the practice described more fully in the text on logic switching and design by Kiester, Ritchie and Washburn entitled "The Design of Switching Circuits," D. VAn Nostrand and Company, publishers, 1951. In this convention, the term "Pulse Present" means that the logic state on the lead in question has switched from logic level "1" to logic level "0."

The pulse synchronizing flip-flops generate the gate signal $\overline{FF2}$ and $\overline{FF4}$ for steering the up and down gates, respectively, of a reversible, three decade pulse rate multiplier reference counter shown at 7, 8 and 9. Each of the counters 7 through 9 comprises one decade of a three decade reversible counter, the detailed construction and operation of which is described more fully in the above-referenced published literature and patents. These up and down steering signals identified as UP–STR and DN–STR are supplied over the conductors 66 and 67, respectively. The pulse synchronizing flip-flops also generate the up and down count trigger pulses FF1 and FF3 that are supplied as the UP–TR and DN–TR input trigger pulses to the trigger inputs of the first decade reversible counter 7. The arrangement of the pulse synchronizing flip-flops is such that they generate steering signals which persist before and after the trigger signal so as to allow an adequate time for the counting action of the reversible counter. As stated previously, the overall effect of the pulse synchronizing flip-flops is to cause the reversible pulse rate multiplier counters 7, 8 and 9 to count up or count down by one count for each input +DP or −DP fringe count pulse supplied from laser interferometer 17.

The FF2 output and FF4 output from the synchronizing flip-flops are supplied through a two input OR gate 10 which derives as output $\overline{FF2} + \overline{FF4}$ summation signal that is supplied to all of the pulse rate multiplier gates 51, 52 and 53 that correspond to each decade of the three decade reversible counters 7, 8 and 9 for reading out the gated comparison of conversion factor numbers and the count accumulated in the counter.

The pulse rate multiplier gates 51, 52 and 53 also have inputs connected to the outputs of the stepping switches of a three decade ratio command stepping switch arrangement shown at 61, 62 and 63, and which correspond to the three decades of the reversible counter. The ratio command switches 61, 62 and 63 comprise the conversion factor read-in circuit means for setting into the pulse rate multiplier the desired value of the conversion constant to be multiplied by the number of input fringe count pulses supplied from laser interferometer 17. The stepping contacts of the ratio command switches 61 through 63 may be set either manually by an operator, or may be selectively stepped in accordance with the output from an automatic measuring instrument arrangement in order to change the value of the conversion constant automatically in response to changes in the operating condition of the laser interferometer. For a number of installations, however, it will be adequate to provide an operator of the conversion apparatus with suitable measuring instrumentation which he can read visually, and then manually set the ratio command switches to the desired values to correspond to the then existing operating conditions.

In operation, the application of the summation signal $\overline{FF2} + \overline{FF4}$ to the input of the pulse rate multiplier gates 51 through 53 causes the pulse rate multiplier gates to produce an output signal on the summation line indicated at ΣL whenever the state of the pulse rate multiplier reference counters 7 through 9 corresponds to the conversion factor command numbers set into the ratio command switches 61 through 63. For a more detailed description of the construction and operation of the pulse rate multiplier gates, and the manner in which they derive the desired readout signals on the summation line ΣL, reference is made to issued U.S. Pat. Nos. 3,283,129 and 3,120,603, and to an article entitled "Inside the Mark Century Numerical Control" by Evans and Kelling appearing in Control Engineering, Volume 10, No. 5, May 1963, pages 112 through 117.

The outputs from the pulse rate multiplier gates appearing on the summation line ΣL are supplied to respective input terminals of two extended three input AND gates 64 and 65, respectively, included in the synchronizing circuits comprised by flip-flops FF1–FF4. The extended three input AND gate 64 has one input terminal connected to summation line ΣL and its remaining two input terminals connected to the $\overline{FF4}$ output of flip-flop FF4 and to the FF3 output of flip-flop FF3, respectively. Similarly, the extended three input AND gate 65 has one input terminal connected to summation line ΣL and its remaining two input terminals connected to the $\overline{FF2}$ output of flip-flop FF2, and to the $\overline{FF1}$ output of flip-flop FF1, respectively.

With the above arrangement, the pulse synchronizing flip-flops FF1–FF4 will operate to sort out the outputs from the pulse rate multiplier gates in accordance with the direction pulses +DP and −DP initially received from laser interferometer 17. In counting up scale, the AND gates 65 will provide output (+G) pulses during intervals before the reversible counter counts up scale, and in counting down scale, the lower gates 64 will provide output (−G) pulses in the interval following the change in state of the reversible counter. This switching of the sampling time dependent upon the direction of the input fringe count pulses makes it possible to use only one set of multiplier gates 51 through 53 for both up-scale and down-scale counting, and makes the overall conversion apparatus simpler to construct, and eliminates reversing errors. Of course, it is possible to provide a different set of gates for each direction. The (+G) and the (−G) output pulses may then be supplied to the block 23 of FIG. 1.

Because the actual position feedback signals appearing at the output of the conversion and conversion factor circuits 18 and 21 are digital in nature, and it is desired to utilize these digitized signals in a phase analog type of positioning servomechanism, it is necessary that the converted, digitized position feedback signal be supplied to a feedback phase counter for producing a corresponding, variably phase shifted, phase analog position output signal in response to the digitized, actual position feedback signal supplied thereto from the output of the conversion circuit means 18. In the circuit arrangement shown in FIG. 1, the converted, digitized actual position feedback signal appearing at the output of the conversion circuit means 18 is supplied through an adapter circuit means 23 to feedback phase counter 22. The variable phase counters 22 and 31 may comprise any conventional phase counter construction such as those described in the above referenced U. S. Pat. No. 3,120,603 for converting a digital count to a corresponding square waveshaped phase analog output signal. In the arrangement shown in FIG. 1, this square waveshaped, phase analog output signal associated with 22 will constitute the actual position feedback phase analog signal that is then supplied as one input to the phase discriminator 16. The adapter circuit means 23 comprises logic gates for supplying the converted, digitized actual position output signals appearing at the output of the conversion circuit means 18 in a form suitable for use with the feedback variable phase counter 22 in synchronism with the operation of the remainder of the numerical controlled system. In one embodiment of the conversion circuitry as previously referenced, output pulses +G and −G are supplied on separate output channels from circuitry 18 and 21 as shown. Pulses +G indicate units of motion in one direction, and pulses −G indicate motion in the opposite direction. One output of adapter 23 supplies feedback phase correction signals and the other the direction of phase correction. The presence of +G signals of the first output coupled with a signal on the second output operates to cause a phase advance of counter 22 by one count. The presence of −G signals on the first output coupled with the absence of a signal on the second output causes a delay in the phase of counter 22 by one clock pulse count. The absence of signals on both outputs results in no change in phase of counter 22, i.e., clock pulses are counted without modification.

The input to the overall numerical contouring control system is comprised by a numerical input data equipment shown at 25 which accepts numerical command data. The input equipment 25 may be a punched tape, punched card, or magnetic tape, digital input subsystem. For most purposes of numerical contouring control, punched tape has been found to be particularly advantageous. The numerical data input equipment 25 reads the instructions and addresses on the input tape so as to generate appropriate electrical signal pulse trains required for controlling the machine 12. Typically, the numerical input information is in coded digital form related to the speed with which the cutting element of machine 12 is to travel while performing its contouring operation. The input information also indicates the X and Y (and Z) departures and their direction for that cut, or the arc center offsets of a circular path to be generated if the particular cut is to be an arc of a circle. The instructions from the input equipment 25 are then routed through the control in accordance with the programmed addresses.

Another type of input is also provided for the control system in the form of a train of timing signal pulses generated by a reference clock oscillator shown at 24. This clock oscillator, as is well known in the digital computer art, provides the timing carrier by which command signals are transported throughout the numerical control system. It also provides a reference timing signal over a conductor 26 to a reference counter 27 that serves to develop the basic squarewave shaped timing synchronizing signal used in controlling the operation of the phase analog servomechanism. The output from the clock oscillator 24 may be applied directly, or is supplied through the intermediate of a pulse rate divider (not shown) as is well known in the art for adapting the reference pulse rate of the clock oscillator 24 for use in different parts of the system having different functions and different operating characteristics. Reference counter 27 and the various pulse rate dividers have not been disclosed in detail since their nature and use in numerical control arrangements is well known in the art, as disclosed in the above referenced U. S. Pat. No. 3,120,603, for example.

Both timing signal pulses from the clock oscillator 24 and input data from the equipment 25 are supplied to a velocity command control shown at 28, and serve to define the commanded velocity with which it is desired that the machine tool shall move. The velocity control 28 then converts a reference pulse rate into a pulse rate represented by a number commensurate with the desired velocity of motion of the machine tool punched into the input tape and fed into the system by the input data equipment. This signal is then supplied to a function generator 29.

The function generator 29 resolves the command velocity supplied from the velocity control 28 into two component pulse rates commensurate with the required velocities in the X and Y directions. the resolution is performed in accordance with the X and Y departures programmed into the punch tape and supplied to the function generator 29 from the numerical data input equipment 25. The X and Y outputs of function generator 29 therefore are two pulse rates commensurate with the X and Y components of velocity required for the motion of the cutting tool. As mentioned earlier, because the X and Y servomechanisms utilizing this information are identical in construction and operation, the description and the arrangement shown in FIG. 1 is restricted to only the Y coordinate system. Other axes or channels can readily be accommodated, as shown for example, by the additional output arrow leads labelled X in FIG. 1.

The Y pulse rate output from function generator 29 is supplied to the Y axis command phase counter 31 along with a command sign signal supplied from the numerical data input equipment 25. The Y pulse rate is also supplied to a Y axis distance counter 44 which controls the length of the path along which the machine travels for the cut being made. Since each pulse supplied from the function generator 29 represents an incremental distance which the cutting tool travels, counting the pulses in the distance counter 44 is the same thing as measuring the distance which the cutting tool travels along the prescribed path. When the distance counter totals a number of pulses equal to the desired path length, it supplies a stop signal over lead 45 to the function generator 29 to inhibit the application of any further command pulses to counter 31. The distance counter is informed by input equipment 25 at the beginning of each path, as to the total count required to achieve the desired path length.

The command phase counter 31 not only has the required Y coordinate pulse rate applied thereto from the function generator 29 but also has supplied thereto the reference clock pulse rate from the system clock 24 as well as a synchronizing signal supplied from the output of the reference counter 27. With these inputs, the command phase counter then operates to develop an output command phase analog signal that is used in conjunction with the actual position phase analog position feedback signal developed by counter 22 to control the motion of the machine.

In operation, consider the situation where the Y feedrate command requires no motion in the Y direction, and the simultaneous condition that the machine tool is at rest in correspondence with the command. Under these circumstances, the pulse rate output from the function generator 29 is zero, thereby maintaining a constant phase on the phase modulated, phase analog signal appearing at the output of the command phase counter 31. It should be noted at this point, that both the system clock and the synchronizing signal supplied from the reference counter 27 are also supplied to the feedback variable phase counter 22, and under the above stated conditions, both the feedback variable phase counter 22 and the command phase counter 31 will provide outputs which are of precisely the same waveshape, and in phase. That is, the application of reference counter 27 output synchronizing signals to counters 31 and 22 is one means to insure that they will start in phase and the application of clock pulses to counters 31 and 22 insures that the counting pulse waveshape and frequency are the same. Alternatively, counters 31 and 22 can be initially reset manually to zero. Accordingly, under the above stated conditions, there will be a zero error output signal from the phase discriminator 16 and the cutting element of machine 12 will remain at rest. Normally the command phase counter 31 counts clock pulses. This count is modified in accordance with the command pulses received from function generator 29. If the direction of motion commanded by the input data is in a negative direction, the count is reduced as for example be deleting clock pulses supplied to the command phase counter 31. When the direction of motion commanded is positive, the count is increased as for example by adding clock pulses or double counting. Whether the direction is positive or negative with respect to the Y coordinate reference position, is indicated to the command phase counter 31 by a signal supplied thereto from the data input equipment 25. The effective change in count in the command phase counter 31 has the net effect of either advancing or retarding the phase of the output phase analog signal supplied from the phase counter to the discriminator 16. It should be noted that an opposite convention of directions could have been chosen. Accordingly, the position servomechanism drives the Y axis feed mechanism in an appropriate direction and at a rate proportional to the error signal developed in the discriminator 16.

As the Y axis feed mechanism continues its motion, it will produce an actual position feedback signal that is converted by the feedback variable phase counter 22 into a feedback phase analog signal that will be supplied to the discriminator 16 in conjunction with the command phase analog signal from command phase counter 31 to develop an error signal that continues to drive the servomechanism in the commanded direction and rate. Thus, the Y axis servomechanism 11 continues its motion until it eventually traverses the entire distance required for the specific command cutting operation. Upon the commanded distance or movement being completed, this fact is recognized in the Y axis distance counter 44 and a blocking signal is generated therein which blocks further supply of pulse rate command signals from function generator 29 to the command phase counter 31. When this happens, pulse rate signals can no longer be added to the clock pulse rate in the command phase counter 31 with the result that the phase of the output from the command phase counter 31 no longer can be changed. Under these circumstances, the output from the feedback variable phase counter 22 will catch up with the output of the command phase counter 31 thereby returning the system to the originally assumed condition and the machine tool 12 comes to rest after completing the particular cutting operation commanded. Additional details of the operation of the system can be obtained from the above identified U.S. Pat. No. 3,120,603 and from an article entitled "Inside the Mark Century Numerical Controls" by Evans and Kelling appearing in Control Engineering, volume 10, number 5, May 1963 issue on pages 112 to 117.

From the foregoing description, it will be appreciated that the present invention provides new and improved numerical control systems of the phase analog type which employ a digitized feedback measurement to provide highly accurate and precise positioning control. The phase analog numerical contouring control systems made available by the invention employ interferometer or similar position gauging devices such as optical gratings referenced in U.S. Pat. No. 3,114,046, or shaft position encoders, for deriving direction indicating, recurrent waveform position signals that provide a precise and accurate representation of the position of a machine tool being controlled. The systems further include means for converting the signal from the interferometer or similar position gauging device into digitized position signals and then into corresponding phase analog position feedback signals for use by the phase analog numerical control system in precisely controlling the relative position of two objects, as for example in the operations of a machine tool.

Also, while reference has been made to application of this invention in contouring systems, it is obvious that the invention has general application to other numerical control arrangements such as numerical positioning control systems where the command pulses represent positioning information.

Having described an embodiment of an improved phase analog numerical control system constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What is claimed as new and desired to be secured by Letters Patent of the United States is:

1. A digitally operable phase analog numerical control comprising digitally operable position measuring means for producing a digitized pulsed waveform output signal indicative of the position of an apparatus being controlled measured along at least one axis of movement of the apparatus, conversion circuit means for converting the digitized output signal from said position measuring means by multiplying the same by a predetermined conversion factor to produce a corresponding second digitized signal representative of the position in desired measurement units, variable rate feedback counter means coupled to the output from the conversion circuit means for producing a variably phase shifted, phase analog actual position output signal in accordance with the digitized position input signal supplied thereto, phase discriminator means having one input coupled to the output from said feedback phase counter, digitally operable command phase counter means for producing an output phase analog commanded position signal of substantially the same base frequency and waveshape as said feedback phase counter means and having its output supplied to a second input to the phase discriminator means, the output of said command phase counter means serving as a command phase analog signal against which the actual position phase analog signal represented by the output of the feedback phase counter means is compared, the output from said phase discriminator means representing the difference between the actual and desired positions of the apparatus being controlled and being utilized to control the position of such apparatus.

2. A phase analog numerical control according to claim 1 further including means for changing the value of the conversion factor by which the input measurement pulses are multiplied in the conversion circuit means.

3. A phase analog numerical control according to claim 2 wherein the digitally operable position measuring means comprises an interferometer position gauging device for deriving fringe count, direction indicating, pulsed waveform electric signals representative of the position of a machine tool being controlled measured with respect to a reference position, and wherein the conversion factor is a value in desired measurement units representative of the space between fringe counts derived by the interferometer position gauging device.

4. An arrangement for controlling the positioning of an object by an analogue servomechanism comprising a source of command information digitally encoded in a plurality of discrete electrical signals, means to produce in a predetermined time interval a train of pulses consisting of a number of pulses determined by said information, a source of clock pulses, first and second countdown circuits coupled to said clock source to product first and second output signals, means to apply said train of pulses to one of said countdown circuits to phase modulate its output signal to a degree proportional to the number of pulses in said train, said servomechanism responsive to the phase difference between said first and second output signals to control the position of said object in accordance with said information, means responsive to the position of said object to produce first digitized pulses indicative of the measured position of said object in nonstandard measuring units, means for converting said first digitized pulses to second digitized pulses indicative of the measured position of said element in standard measuring units, means responsive to said second pulses to provide a train of feedback pulses whose number is representative of said measured position of said element, means to apply said train of feedback pulses to the other of said countdown circuits to phase modulate its output signal to a degree proportional to the number of pulses in said train of feedback pulses.

* * * * *